(12) United States Patent
Haws et al.

(10) Patent No.: US 7,866,720 B2
(45) Date of Patent: Jan. 11, 2011

(54) SHOVEL WITH AUXILIARY HANDLE

(75) Inventors: Matthew Haws, Noblesville, IN (US); David L. Garrison, Indianapolis, IN (US)

(73) Assignee: Remco Products Corporation, Zionsville, IN (US)

( * ) Notice: Subject to any disclaimer, the term of this patent is extended or adjusted under 35 U.S.C. 154(b) by 1071 days.

(21) Appl. No.: 11/633,708

(22) Filed: Dec. 5, 2006

(65) Prior Publication Data

US 2008/0129061 A1  Jun. 5, 2008

(51) Int. Cl.
*A01B 1/02* (2006.01)
*A01B 1/22* (2006.01)

(52) U.S. Cl. ........................................ 294/58; 294/54.5
(58) Field of Classification Search .................. 294/49, 294/54.5, 55, 58
See application file for complete search history.

(56) References Cited

U.S. PATENT DOCUMENTS

| | | | |
|---|---|---|---|
| 212,953 A * | 3/1879 | Kreider | 294/49 |
| 321,326 A | 6/1885 | Waite | |
| 479,661 A | 7/1892 | Poulson | |
| 798,127 A | 8/1905 | Burnett | |
| 821,847 A * | 5/1906 | Arnavat | 294/49 |
| 902,983 A | 11/1908 | Manahan | |
| 969,528 A | 9/1910 | Disbrow | |
| 1,135,820 A | 4/1915 | Korteum et al. | |
| 1,184,821 A | 5/1916 | Cantley | |
| 2,546,113 A | 3/1951 | Spang | |
| 2,648,959 A | 8/1953 | Budzyna | |
| 3,014,750 A | 12/1961 | Briggs | |
| D198,979 S * | 8/1964 | Petoe | 294/49 |
| 3,226,149 A | 12/1965 | McJohnson | |
| 4,125,951 A | 11/1978 | Huerth | |
| 4,149,744 A | 4/1979 | Bonnes | |
| 4,245,411 A | 1/1981 | McMath | |
| 4,280,727 A | 7/1981 | Germain | |
| 4,378,670 A | 4/1983 | Check et al. | |
| 4,476,939 A | 10/1984 | Wallace | |
| 4,607,872 A | 8/1986 | Herner | |
| 4,655,494 A * | 4/1987 | Eads et al. | 294/49 |
| 5,056,245 A | 10/1991 | Jenkins et al. | |
| 5,645,305 A | 7/1997 | Lispi | |
| 5,787,588 A * | 8/1998 | Tisbo et al. | 294/57 |
| 5,887,919 A | 3/1999 | Sallinen et al. | |
| D430,464 S * | 9/2000 | Claxton | D8/13 |
| 7,121,599 B2 * | 10/2006 | Demar et al. | 294/57 |

\* cited by examiner

*Primary Examiner*—Paul T Chin
(74) *Attorney, Agent, or Firm*—Baker & Daniels LLP

(57) ABSTRACT

A shovel is provided having a scoop, a shaft coupled to the scoop, a handle coupled to the shaft, and an aperture within the center of its scoop. The aperture in the scoop is configured and positioned to provide an auxiliary handle for a user to grasp in addition to the shovel handle coupled to the shaft.

14 Claims, 3 Drawing Sheets

SHOVEL WITH AUXILIARY HANDLE

TECHNICAL BACKGROUND

The present disclosure relates generally to a shovel. More particularly, the present disclosure relates to a shovel having an aperture within the center of a scoop configured to be an auxiliary handle.

BACKGROUND AND SUMMARY

Typical shovels providing auxiliary handles require the manufacture and attachment of separate components. Other shovels require multiple auxiliary handles to provide balance, while others require that the auxiliary handles are spaced away from the main handle.

According to a first embodiment of the present disclosure, a shovel is provided comprising a shaft having first and second ends; a scoop having a top surface configured to be a collection surface, a bottom surface, a back, a leading edge, and a central plane extending substantially perpendicular to the leading edge, wherein the first end of the shaft is attached to the scoop at a point along the central plane; and an aperture within the back of the scoop, the aperture being disposed along the central plane of the scoop.

According to a second embodiment of the present disclosure, a shovel is provided comprising a scoop including a bottom, a plurality of sides coupled to the bottom, a back coupled to the bottom and sides; the bottom, sides, and back cooperating to define a load space, the back having a void defined therein to form a scoop handle; and a shaft including first and second ends and defining a longitudinal axis, the first end being coupled to the scoop such that a plane perpendicular to the bottom of the scoop and containing the longitudinal axis intersects the void.

According to another embodiment of the present disclosure, a shovel is provided comprising a scoop including a bottom, a plurality of sides coupled to the bottom, and a back coupled to the bottom and sides; the bottom, sides, and back cooperating to define a load space, the back having a first handle defined in the center thereof; and a shaft including first and second ends, the first end being coupled to the center of the back of the scoop.

BRIEF DESCRIPTION OF THE DRAWINGS

The above-mentioned and other features of this disclosure, and the manner of attaining them, will become more apparent and the invention itself will be better understood by reference to the following description of embodiments of the invention taken in conjunction with the accompanying drawings, wherein.

Figure 1:
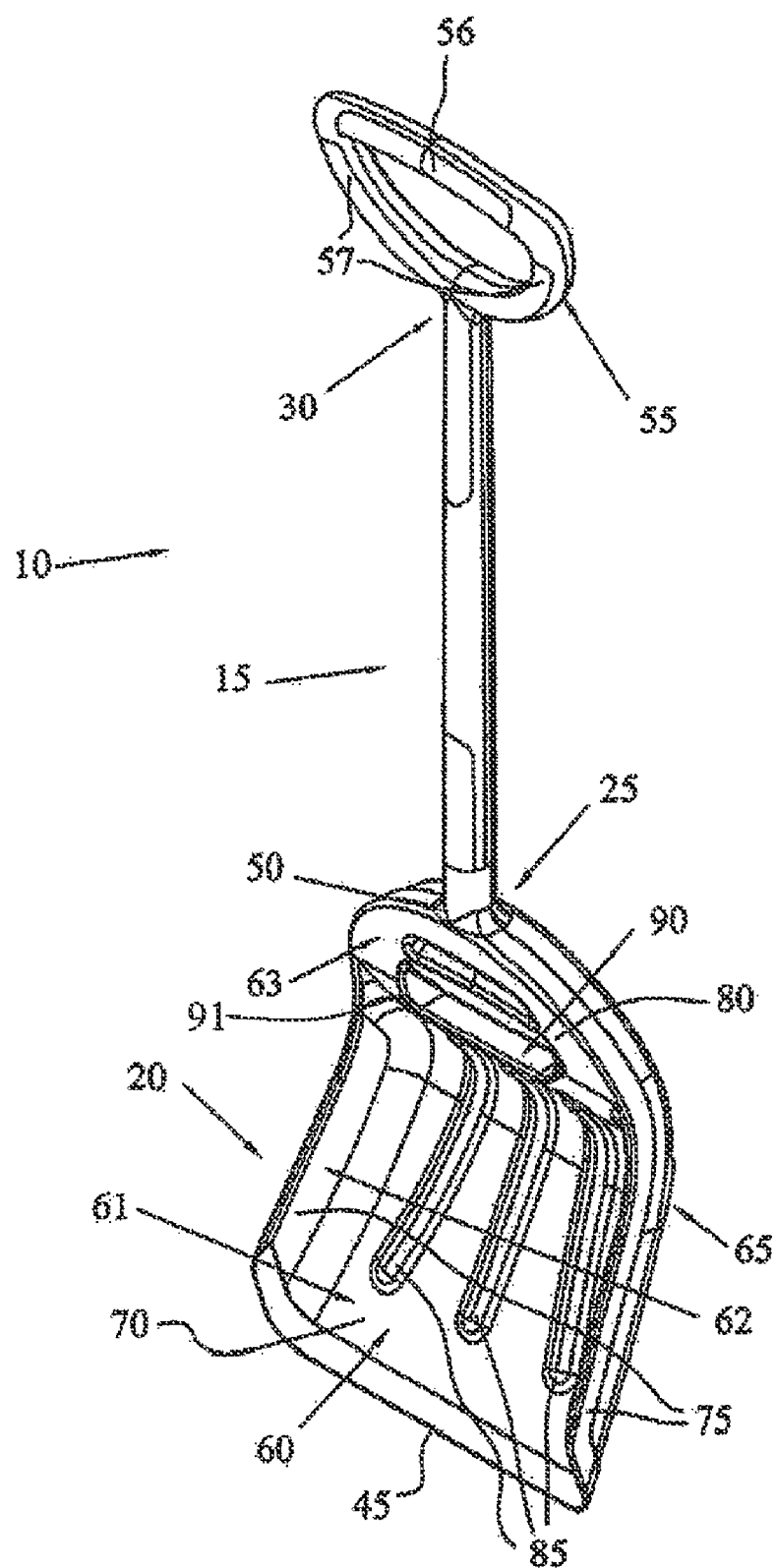
FIG. 1 is a side perspective view of an embodiment of the shovel.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure in several forms, and such exemplification is not to be construed as limiting the scope of the disclosure in any manner.

DETAILED DESCRIPTION OF THE DRAWINGS

The embodiments discussed below are not intended to be exhaustive or limit the invention to the precise forms disclosed in the following detailed description. Rather, the embodiments are chosen and described so that others skilled in the art may utilize their teachings.

A shovel 10 is shown having a scoop 20, a shaft 15, and a shaft handle 55. The scoop 20 includes a bottom 70, sides 75, a back 80, a top surface 60, a bottom surface 65, and a rear support wall 76. The bottom 70 is coupled to the sides 75 and to the back 80. The sides 75 are also each coupled to the back 80. The scoop 20 is constructed of plastic, but may be constructed from other materials.

Figure 3:
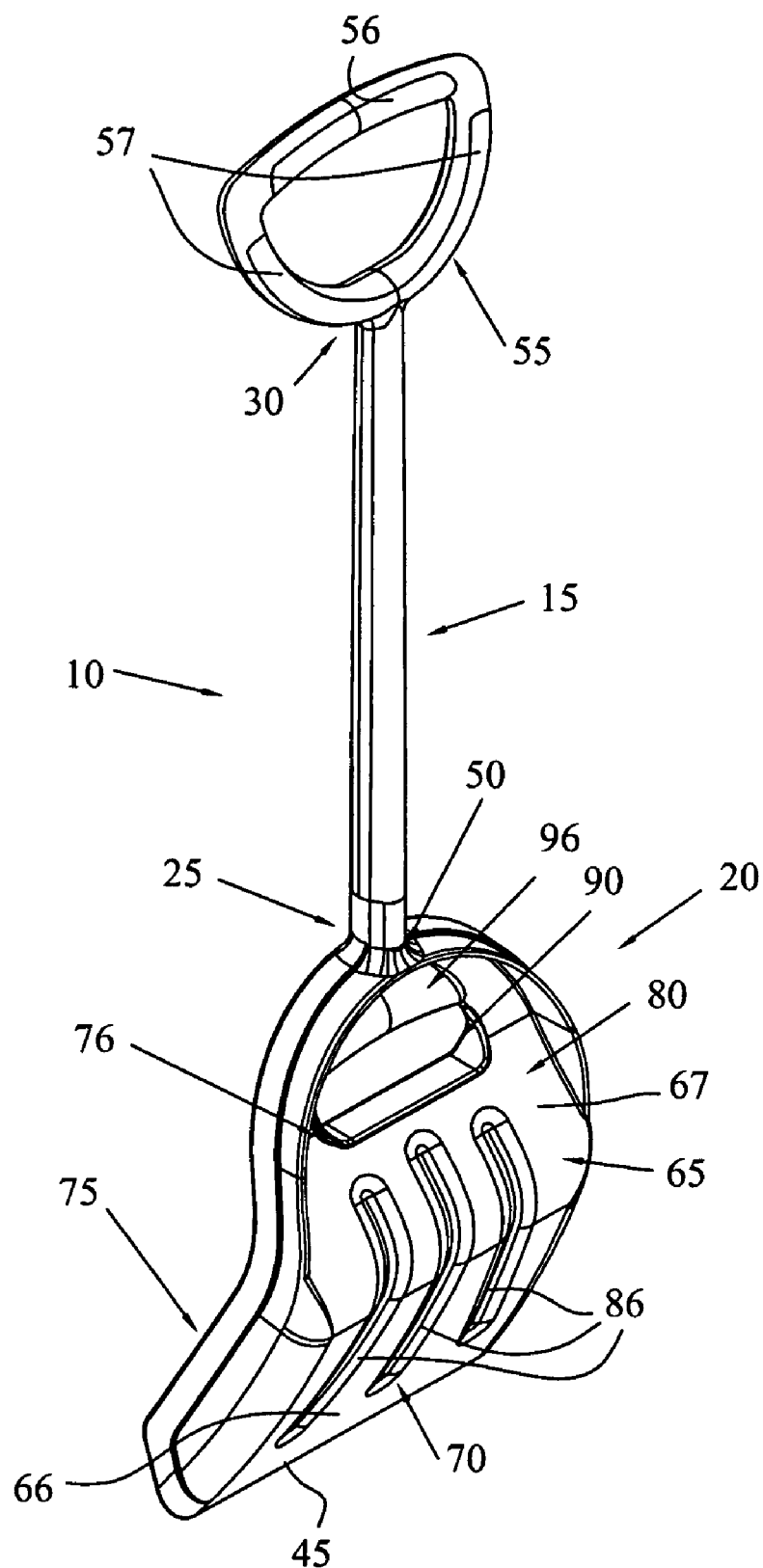
FIG. 3 is a bottom perspective view of the shovel of FIG. 1.

The top surface 60 of the scoop 20 is shown in FIG. 1. The top surface 60 of the scoop 20 includes a top surface 61 of the bottom 70, a top surface 62 of the sides 75, and a top surface 63 of the back 80, which cooperate to define a load space or collection surface for dirt, debris, and other matter. The bottom surface 65 of the scoop 20 is shown in FIG. 3. The bottom surface 65 of the scoop 20 includes a bottom surface 66 of the bottom 70 and a bottom surface 67 of the back 80.

The rear support wall 76 of the scoop 20 is shown in FIG. 3. The rear support wall 76 is coupled to the back 80 of the scoop. More specifically, the rear support wall 76 is coupled to the bottom surface 67 of the back 80, and at least partially surrounds the back 80 of the scoop 20. The rear support wall 76 may extend from the sides 75 on the scoop 20. The rear support wall 76 adds strength to the scoop 20, specifically in the area including the aperture 90 discussed below, and reduces deflection of the scoop 20 under load.

The bottom 70 and back 80 of the scoop 20 include raised ridges 85 and hollow ridges 86. Specifically, as shown most clearly in FIG. 1, the raised ridges 85 are defined on the top surface 61 of the bottom 70 and the top surface 63 of the back 80. As shown most clearly in FIG. 3, the hollow ridges 86 are defined on the bottom surface 66 of the bottom 70 and the bottom surface 67 of the back 80. The hollow ridges 86 are positioned directly beneath the raised ridges 85. The hollow ridges 86 are configured to lessen the vacuum effect beneath the scoop 20 when the bottom surface 66 of the bottom 70 is lifted off a surface. Ridges 86 also provide added rigidity to bottom 70.

Additionally, the bottom 70 of the scoop 20 includes a leading edge 45. As shown most clearly in FIG. 2, a central plane 40 extends through the center of the scoop 20 and is substantially perpendicular to both the leading edge 45 and to the bottom 70 of the scoop 20. To aid in collecting matter, the bottom 70 may be wider at the leading edge 45 than where the bottom 70 couples with the back 80 of the scoop 20.

Additionally, the back 80 of the scoop 20 includes an aperture 90 or hole therein, an indentation 95, and a protrusion 96. As shown most clearly in FIG. 2, the central plane 40 intersects the aperture 90. The aperture 90 is configured to receive a plurality of fingers from the user's hand, thereby acting as an auxiliary scoop handle. Embodiments are envisioned where the aperture 90 includes a lip 91 on at least the lower edge thereof. Lip 91 extends upward into the load space to provide a wall that at least partially prevents material in the load space from entering and falling through the aperture 90. Additionally, lip 91 helps isolate a user's hand that is engaging the aperture 90 from coming in contact with the matter being held within the load space.

Figure 2:
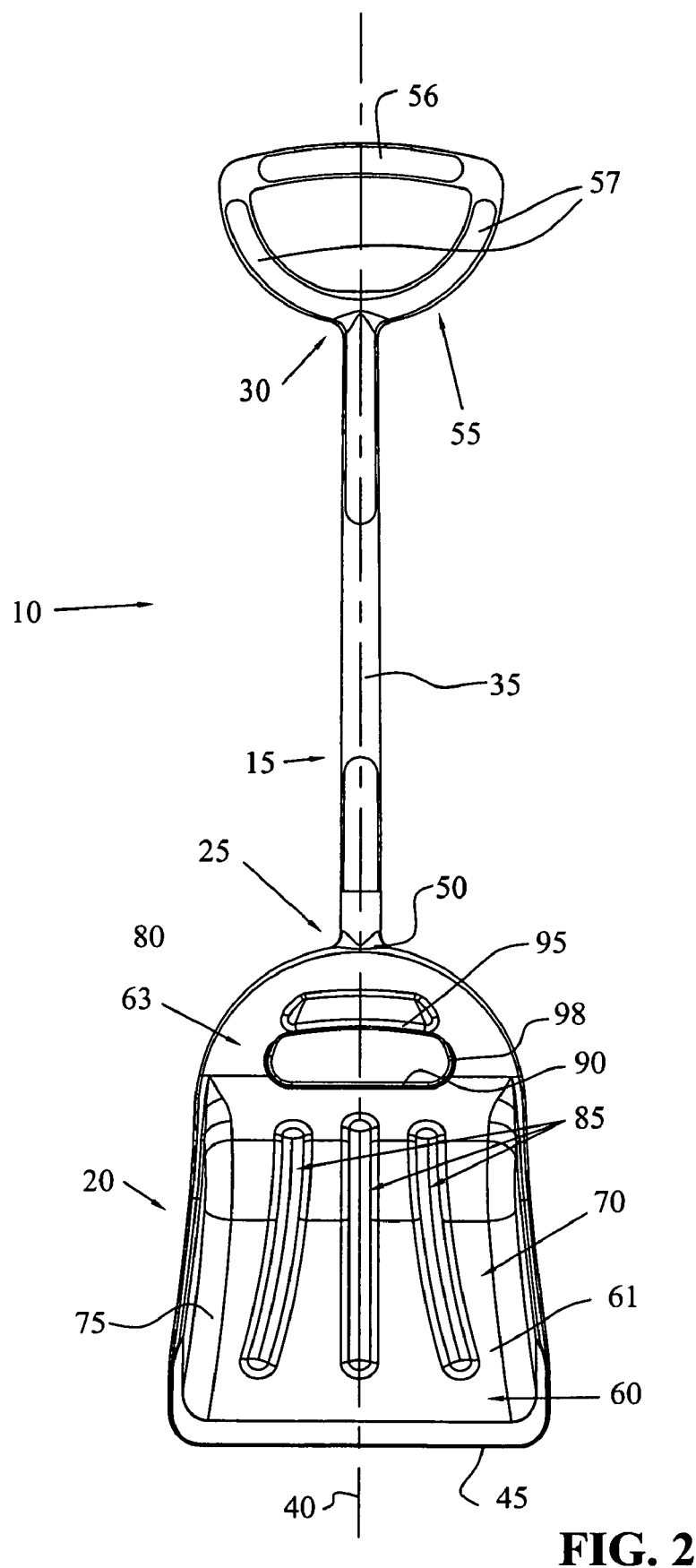
FIG. 2 is a top elevation view of the shovel of FIG. 1.

FIG. 2 most clearly shows the indentation 95 on the back 80 of the scoop 20. More specifically, the indentation 95 is defined on the top surface 63 of the back 80. The indentation 95 is located proximate to the aperture 90. FIG. 3 most clearly shows the protrusion 96 on the back 80 of the scoop 20. More specifically, the protrusion 96 is defined on the bottom surface 67 of the back 80. The protrusion 96 is located proximate to the aperture 90, and is formed directly beneath the indentation 95.

FIG. 2 shows the shaft 15 of the shovel 10. The shaft 15 has a first end 25 and a second end 30 that define a longitudinal axis 35 extending therebetween. The first end 25 of the shaft 15 is attached to the scoop 20 at a point 50 along the central plane 40 of the scoop 20 toward the back 80 of the scoop 20. The point 50 is located in the center of the rear support wall 76, thereby providing a sturdy surface for connecting the shaft 15 to the scoop 20. By placing the point 50 in the center of the scoop 20, the central plane 40 of the scoop 20 contains the longitudinal axis 35 of the shaft 15. The shaft 15 may be constructed of plastic, wood, or metal. The shaft 15 and scoop 20 may formed from a single piece, or may be separate pieces attached at point 50 with screws, nails, glue, or any other conventional or known means of attachment.

FIG. 2 also shows the shaft handle 55 of the shovel 10. The shaft handle 55 is coupled to the second end 30 of the shaft 15. The shaft handle 55 includes several gripping sections, including a top section 56 and side sections 57. The top section 56 is configured to be gripped by one or both of a user's hands. The side sections 57 are also configured to be gripped by a user's hand. Specifically, side sections 57 are configured to be gripped by a user's first hand when a user's second hand is employing the aperture 90. Having right and left side sections 57 allows the shovel 10 to be used comfortably by both right-handed and left-handed users. The shaft handle 55 may be constructed of plastic, or may be constructed of the same material as the shaft 15. The shaft 15 and the shaft handle 55 may formed from a single piece, or may be separate pieces attached with screws, nails, glue, or any other conventional or known means of attachment.

In operation, a user grips the shaft 15 or the shaft handle 55 with one hand. With the other hand, the user grips the aperture 90 by inserting a plurality of fingers through the aperture 90. While the fingers inserted through the aperture 90 contact the bottom surface 65 of the scoop 20, the remaining portion of the hand contacts the top surface 60 of the scoop 20. The remaining portion of the hand, such as the thumb and portions of the palm, may rest in the indentation 95 for additional support and grip. Like the indentation 95, the protrusion 96 provides additional support when gripped by the fingers inserted through the aperture 90. The user is able to fill, lift, carry, or empty the shovel 10 with both hands.

The location of the aperture 90 within the scoop 20 provides leverage while still permitting a user to simultaneously grip the aperture 90 with one hand and the shaft 15 or the shaft handle 55 with the other hand. The location of the aperture 90 within the scoop 20 also allows for easy manufacturing, such as injection molding. The location of the aperture 90 on the back 80 of the scoop 20 minimizes the amount of matter falling through the aperture 90 and avoids contact between the user's hand and the matter. The location of the aperture 90 in the center of the scoop 20 aligns the aperture 90 with the lateral center of gravity of the shovel 10 and with the shaft 15, thereby allowing for steady and even lifting. The location of the aperture 90 within the scoop 20 provides a gripping surface proximate the longitudinal center of gravity of a loaded shovel 10, thereby balancing the shovel 10 and inducing less fatigue on a user when lifting the loaded shovel 10.

While this device has been described as having an exemplary design, the present device may be further modified within the spirit and scope of this disclosure. This application is therefore intended to cover any variations, uses, or adaptations of the device using its general principles. Further, this application is intended to cover such departures from the present disclosure as come within known or customary practice in the art to which this invention pertains.

The invention claimed is:

1. A shovel comprising:
a shaft having first and second ends;
a scoop having a top surface configured to be a collection surface, a bottom surface, a back, a leading edge, and a central plane extending substantially perpendicular to the leading edge, wherein the first end of the shaft is attached to the scoop at a point along the central plane; and
an aperture within the back of the scoop, the aperture being disposed along the central plane of the scoop, the bottom surface of the scoop further comprising a protrusion located proximate to the aperture such that fingers from a user's hand contact the protrusion on the bottom surface of the scoop when the fingers are inserted through the aperture.

2. The shovel of claim 1, wherein the top surface of the scoop further comprises an indentation located proximate to the aperture.

3. The shovel of claim 2, wherein the indentation is positioned such that a portion of a user's hand rests against the indentation when fingers are inserted through the aperture.

4. The shovel of claim 1, wherein the scoop includes a lip along an edge of the aperture.

5. The shovel of claim 1, further comprising a handle coupled to the second end of the shaft.

6. A shovel comprising:
a scoop including a bottom, a plurality of sides coupled to the bottom, a back coupled to the bottom and sides; the bottom, sides, and back cooperating to define a load space, the back having a void defined therein to form a scoop handle, the scoop further including a protrusion located proximate the void such that fingers from a user's hand contact the protrusion when the fingers are inserted through the void; and
a shaft including first and second ends and defining a longitudinal axis, the first end being coupled to the scoop such that a plane perpendicular to the bottom of the scoop and containing the longitudinal axis intersects the void.

7. The shovel of claim 6, wherein the scoop further comprises an indentation located proximate to the void.

8. The shovel of claim 7, wherein the indentation is positioned such that a portion of a user's hand rests against the indentation when fingers are inserted through the void.

9. The shovel of claim 6, wherein the scoop further comprises hollow ridges.

10. The shovel of claim 6, further comprising a handle coupled to the second end of the shaft.

11. A shovel comprising:
a scoop including a bottom, a plurality of sides coupled to the bottom, and a back coupled to the bottom and sides; the bottom, sides, and back cooperating to define a load space, the back having a first handle defined in the center thereof, the scoop further including a protrusion located proximate to the first handle such that fingers from a user's hand contact the protrusion when the fingers are inserted through the first handle; and
a shaft including first and second ends, the first end being coupled to the center of the back of the scoop.

12. The shovel of claim 11, wherein the scoop further comprises an indentation located proximate to the first handle.

13. The shovel of claim 12, wherein the indentation is sized and shaped to receive a portion of a user's hand therein.

14. The shovel of claim 11, further comprising a second handle coupled to the second end of the shaft.

* * * * *